June 21, 1966 O. J. KING 3,257,180
VAPOR INJECTION SYSTEM
Filed Jan. 18, 1963

INVENTOR
O. J. KING

BY Beale and Jones
ATTORNEYS

United States Patent Office 3,257,180
Patented June 21, 1966

3,257,180
VAPOR INJECTION SYSTEM
O. J. King, Odessa, Tex., assignor to Mercury
Development Company
Filed Jan. 18, 1963, Ser. No. 252,468
5 Claims. (Cl. 48—180)

This invention relates to a method and apparatus for claiming the vapors which form within storage tanks containing hydrocarbons in their liquid state. Moreover, the instant invention provides apparatus capable of enriching a flowing supply of combustible gases with the vapors claimed from the liquid storage tanks.

It is well known that gaseous vapors form near the surface of liquid petroleum which is in a storage tank. The vapors so formed accumulate within the tank and naturally, if the tank remains closed, the pressure will increase to a level above atmospheric pressure. To avoid the pressure buildup and possible tank rupture, petroleum storage tanks are commonly vented to the atmosphere from a point above the liquid level. This results in the release and unnecessary waste of valuable vapors.

Attempts have been made heretofore to recover the vapors given off by the more volatile hydrocarbons such as gasoline, but to the knowledge of the inventor, no systems have been usable for recovery of vapors given off by less volatile liquids, especially crude oil.

It is an object of this invention to provide a system for recovering and using the vapors generated in storage tanks containing hydrocarbons, which are in the liquid state under atmospheric pressure and atmospheric temperature. The disclosed system is not limited to use with gasoline and similar volatile materials, but may readily be used for recovering vapors of the heavier, less volatile hydrocarbons.

An object of this invention is to avoid venting to the atmosphere and wasting the vapors generated in storage tanks, by claiming these vapors for use in a system where another combustible gas is flowing.

Another object is to provide the ultimate consumer of combustible gases with a richer product, by enriching the flowing supply of gases with the vapors claimed from the above-mentioned storage tanks.

A further object is to provide a relatively inexpensive means for claiming storage tank vapors. The system disclosed herein does not require constant maintenance and its installation is relatively simple.

These and other objects may be seen by reference to the following description and drawings wherein.

For purposes of clarity, the word "gas" refers to the gaseous supply from a source such as shown at 14; "vapor" refers to the vapors formed in tanks 12 and drawn through conduits 16; and "fluid" will apply generically to gas, vapor, or a mixture thereof. The term "upstream" is used in its usual sense, meaning toward the direction from which the fluid is coming. 'Downstream'" is, of course, the opposite.

Figure 1:
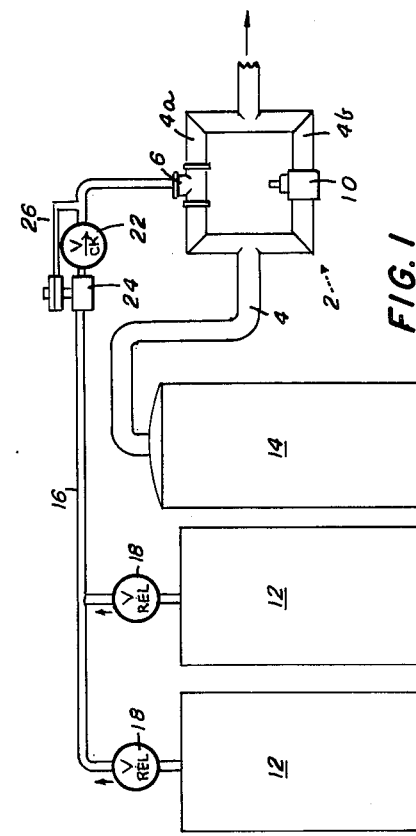
FIG. 1 is a diagrammatic drawing of the system of the instant invention.

Referring to FIG. 1 it will be seen that the heart of the instant invention is the vapor injection section, generally designated 2, having two branches arranged for parallel gas flow. These branches are portions of a gas-carrying conduit, generally designated 4.

The upper branch 4a has an injector 6 located therein and the lower branch 4b has a serially connected regulator 10. It is in this vapor injection section 2 that the vapors which form in the liquid storage tanks 12 are allowed to commingle with and enrich the gas which is flowing from any suitable gas source. Each of these valves has a compression 44 acting on the valve stem 46 to bias the valve disc 48 into a closed position. A regulating bolt 50 may be turned to vary the spring compression and the setting on the valve. A diaphragm 52 is located in a hollow chamber and it is connected to the valve stem 46. A control line 20 leads to one side of the diaphragm, and thus the pressures which develop on this side of the diaphragm will opposite the force of the spring to open the valve. The control line 20 used with valve 18 may run to the tanks 12 or to the conduit which leads from the tank to the valve.

As the pressure in the tank increases, the valve 18 lifts, and when the pressure becomes lower, the spring 44 causes the valve to reseat.

It has been found most satisfactory to have the relief valve 18 lift at 0.250 p.s.i.g. and reseat at minus 0.125 p.s.i.g., but the possible range extends to lifting pressures of 7 p.s.i.g. and reseating pressures of minus 1 p.s.i.g. The regulators used in the pilot installation have been accurate within 0.04 p.s.i., so as a rather fine adjustment can be made.

If desired, single relief valve 18 may be used for a plurality of liquid storage tanks. This may be done by placing the valve 18 in the conduit 16 on the downstream side of the tank connections and running the control line 20 to the upstream or tank side of the valve.

In order to prevent the gas from flowing into the vapor line 16 and thereby pressurizing the tanks, either a check valve 22 or a pressure regulator valve 24 may be used. As an extra precaution, both may be used as here illustrated.

The check valve 22 may be of any conventional design and it will permit the vapors to flow therethrough only in the direction toward the injector 6, as indicated by the arrow in FIG. 1.

The pressure regulator valve 24 is constructed similarly to the relief valve 18, except that the control line 26 runs to the opposite side of the diaphragm than in valve 18. This is necessary since the fluids in the vapor line 16 are at a pressure below atmospheric, for reasons described herebelow. When the vacuum in the conduit 16 is sufficiently high, the valve remains open. However, when the vacuum becomes lower and the actual pressure approaches or becomes greater than atmospheric pressure, the valve 24 closes to prevent the pressurized gas from flowing into the liquid storage tanks 12.

Figure 2:
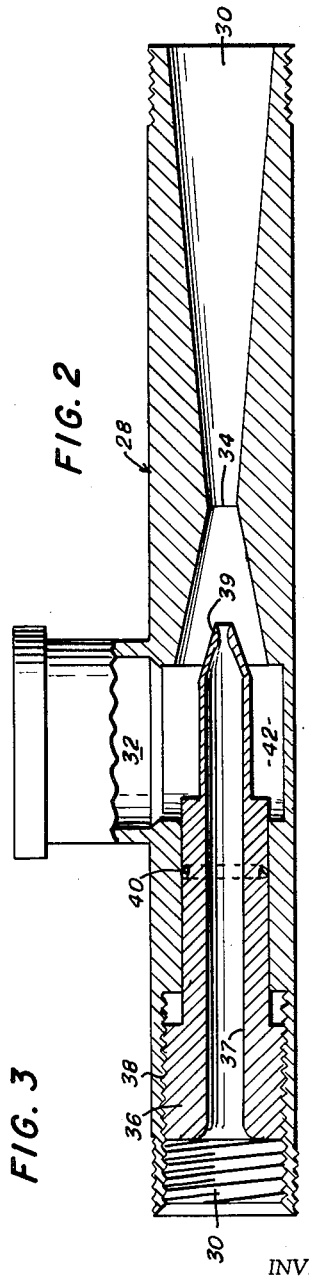
FIG. 2 is a cross-sectional view of one form of injector which may be used with the instant invention.
Figure 3:
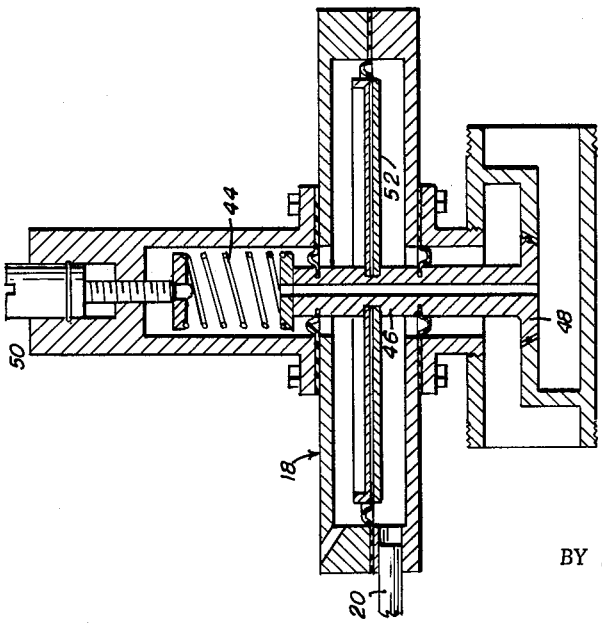
FIG. 3 is a cross-sectional view of a relief valve which may be used in the system.

The vapor from the liquid storage tank first contact the flowing gases in the injector 6. This injector is illustrated in FIG. 2, and it operates on the general principle of a jet pump. In such an injector, a flowing supply of gas is passed through a passage having a restriction or Venturi which reduces its pressure while increasing its velocity. A second passage, carrying vapor, communicates with the restricted portion of the passage. If the reduced pressure in the Venturi throat is less than that in the second passage, the vapors in the second passage will, of course, be drawn into the stream of gas passing through the first passage.

An injector which may be used with this invention is shown in FIG. 2. It comprises a body member 28 with a gas passage 30 and a vapor passage 32. The restriction 34 is in the gas passage, as is a threaded jet insert 36. A central bore 37 and a tapered end 39, both in insert 36, cause the insert 36 to act as a nozzle which discharges the gases into the restriction 34. This insert 36 may be rotated about its central longitudinal axis, so that the threads 38 cause it to move axially to change the position of the jet with respect to the restriction. This allows for fine adjustments in various installations. An O-ring gasket 40 seals the joint between the insert 36 and the body member 28.

Directly upstream from the restriction 34 and surrounding the tip portion of the insert 36, a chamber 42 of annular cross-section communicates with the second passage, the vapor passage 32.

From the above description it can be seen that the flow of gas through the passage 30 will reduce the pressure in a section of the gas passage and draw the vapors in passage 32 into the gas, causing intimate commingling of the vapor and the gas.

Since the injector 6 is limited in its capacity, it will generally be necessary to bypass some of the gas through another line, such as the lower branch 4b of the vapor injection system 2. Since both branches 4a and 4b stem from and return to the same main conduit, they may be regarded as having a common inlet area and a common outlet area; the inlet area being at the upstream end of the branches and the outlet area being out the downstream end of the branches. To control the flow of gases through this lower branch, means such as the regulator 10 are necessary. A typical suitable regulator is the G Series back pressure regulator made by Kimray, Inc. Regulators of this type maintain a constant upstream pressure on a gas supply. The pressure differential across such a valve may be from 5 to 200 p.s.i.

In a regulator of this type, a valve in the flow line tends to close when the upstream pressure becomes too low and tends to open when the upstream pressure becomes too high, thus maintaining the upstream pressure reasonably constant at the common inlet area of the branches.

Other types of flow or pressure regulators may be adequate in this position, so long as a differential pressure exists thereacross, so that gases will flow through the upper branch 4a which contains the injector 6. A reducing valve or a valve maintaining a constant downstream pressure may be used at 10.

The gases which pass through the lower branch 4b reunite with those enriched gases coming from the upper branch 4a, and pass on either to the consumer, or into storage installations. The fluids are generally in the pressure range of from 1 to 30 p.s.i.g. as they pass from the vapor injection section 2.

From the above, the operation of the system is quite clear. A flowing supply of gas from source 14 passes through a first conduit 4 which includes an injector 6 with a restriction 34. The restriction reduces the pressure in a portion of the conduit.

Vapors from liquid storage tanks pass through a second conduit 16 which contains relief valves 18 and devices 22 and 24 which prevent the gas pressure from reaching the storage tanks. The conduit 16 joins the conduit 4 at the point where the gas is at a reduced pressure, thus allowing the vapors to be drawn into the flowing gas.

A bypass or lower branch 4b may be provided to allow some gases to flow in parallel around the injector 6, while the regulator 10 maintains a sufficient differential pressure across the injector.

It is understood, of course, that the instant invention is not to be limited by the above description but by the claims which follow. Obviously, the gases may be of any combustible variety, and the liquids in the storage tanks may be of any type.

I claim:

1. Apparatus for recovering vapors from a liquid hydrocarbon storage tank and enriching a flowing supply of combustible gas, comprising, a closed storage tank for a liquid hydrocarbon, a quantity of liquid hydrocarbon at substantially atmospheric pressure and temperature in said tank and having a volatility no greater than gasoline, a pressurized source of combustible gas spaced from said closed storage tank, a first conduit connected with said pressurized source and carrying combustible gas and having at least two parallel branches, said branches sharing a common inlet area and a common outlet area, said first conduit having constriction means for reducing the pressure in a portion of at least one of said branches, means in the remaining branches for maintaining a pressure differential between said inlet area and said outlet area, and a second conduit leading from said portion of reduced pressure to a point above a liquid level in said tank whereby vapors from said tank are drawn to and through the portion of reduced pressure for commingling with the gas therein, said first conduit having a portion leading said commingled gas and vapor away from said source and downstream from said portion of reduced pressure.

2. The apparatus of claim 1 wherein said means for maintaining a pressure differential is a valve means maintaining a constnt upstream pressure.

3. The apparatus of claim 1 having check valve means in said second conduit, said check valve means permitting flow only from said tank to said area of reduced pressure.

4. The apparatus of claim 1 having pressure responsive valve means in said second conduit, said pressure responsive valve means being responsive to pressure in said second conduit and closing when said pressure in said second conduit passes above a second predetermined level; whereby said pressure responsive valve will close in the event that an influx of gas from said first conduit causes pressure to rise in said second conduit.

5. The apparatus of claim 1 having relief valve means in said second conduit, said relief valve means responsive to pressure in said tank and opening when pressure in said tank passes above a first predetermined level.

References Cited by the Examiner
UNITED STATES PATENTS

| | | | |
|---|---|---|---|
| 1,841,325 | 1/1932 | Deming. | |
| 2,126,367 | 8/1938 | Clawson et al. | |
| 2,165,342 | 7/1939 | Campbell | 48—190 X |
| 2,471,161 | 5/1949 | McCordic | 48—197 X |
| 2,543,653 | 2/1951 | Woog | 62—50 X |
| 2,606,108 | 8/1952 | Ensign | 48—191 |
| 2,676,876 | 4/1954 | Mosely | 48—191 X |
| 2,747,790 | 5/1956 | Schnitz | 230—95 |
| 3,091,096 | 5/1963 | Rendos et al. | 62—52 |

MORRIS O. WOLK, *Primary Examiner.*

JOSEPH SCOVRONEK, *Assistant Examiner.*